Jan. 9, 1962  K. HÄUSSERMANN ET AL  3,016,120
CLUTCH, ESPECIALLY FOR MOTOR VEHICLES
Filed July 2, 1958
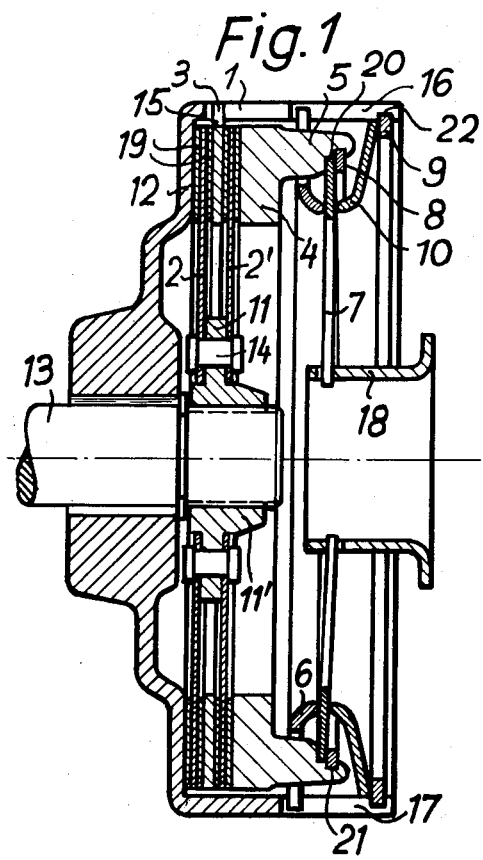
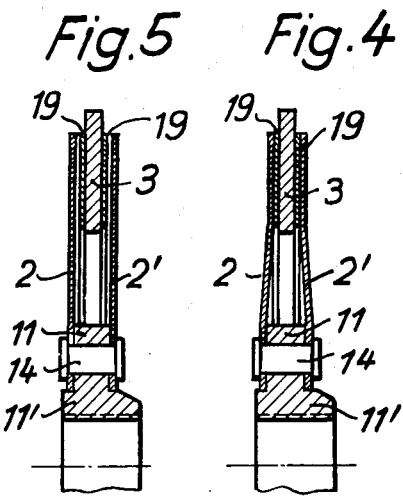
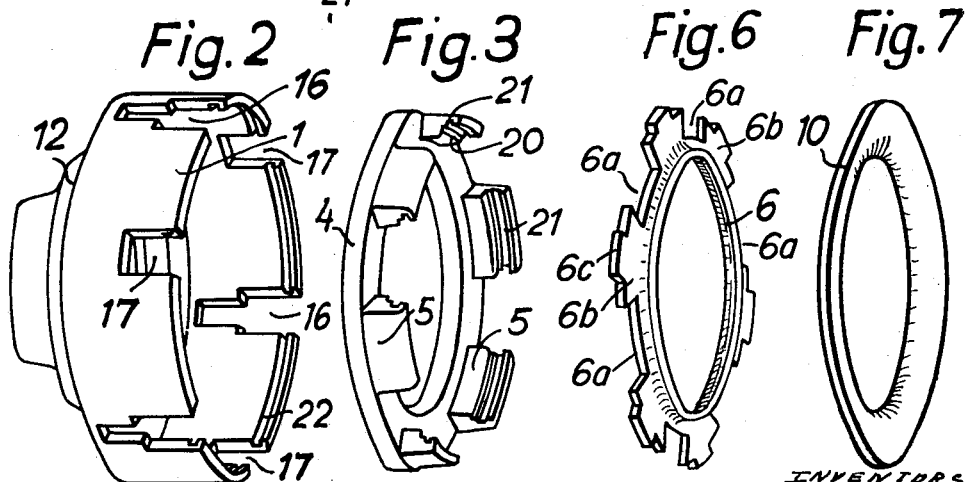

3,016,120
CLUTCH, ESPECIALLY FOR MOTOR
VEHICLES
Kurt Häussermann, Stuttgart-Oberturkheim, Paul Maucher, Stuttgart, and Hans Stallbaumer, Esslingen-Hohenbuhl, Germany, assignors to Lamellen- und Kupplungsbau August Haussermann, Stuttgart-Oberturkheim, Germany
Filed July 2, 1958, Ser. No. 746,189
Claims priority, application Germany Dec. 5, 1957
2 Claims. (Cl. 192—89)

The present invention relates to a clutch, especially for motor vehicles and, more particularly, to a disc clutch.

With heretofore known disc clutches for motor vehicles such as automobiles, generally, on the output side of the engine there is arranged a sufficiently large flywheel to which a clutch with sufficiently large friction discs may be connected. Therefore, in most instances a plate with facings on opposite sides will suffice for establishing frictional connection between the engine and the clutch. However, with small vehicles, the installation of discs with friction surfaces sufficient for the transmission of the torque meets with difficulties because the space available in axial direction is rather limited. Numerous attempts and suggestions have been made heretofore in order to solve this problem. The difficulties encountered in this connection are primarily due to the fact that a sufficiently long disengaging stroke must be available for the friction discs in axial direction of the clutch while the clutch must be limited to a rather small space. In addition thereto, the clutch must be able to be produced under similar advantageous conditions as they now prevail with modern clutch production for ordinary passenger cars so that the clutch can be produced at low costs and can easily be repaired.

It is, therefore, an object of the present invention to provide a friction disc clutch which will overcome the above mentioned drawbacks and will meet the requirements set forth in the preceding paragraph.

It is another object of this invention to provide a friction disc clutch which will be of rather small dimensions and will always assure a proper disengaging stroke of the friction discs.

These and other objects and advantages of the invention will appear more clearly from the following specification in connection with the accompanying drawings, in which:

FIG. 1 represents an axial section through a clutch according to the present invention.

FIG. 2 is a perspective view of a bell-shaped clutch body employed in connection with the clutch according to the invention.

FIG. 3 is a perspective view of a pressure plate employed in connection with the clutch according to the present invention.

FIGS. 4 and 5 respectively show on a somewhat exaggerated scale the positions of the various plates and discs when the clutch is engaged and when the clutch is disengaged.

FIGS. 6 and 7 respectively show in perspective a counter plate and a lid forming part of the clutch according to the present invention.

General arrangement

The clutch according to the present invention is characterized primarily in that the outer body of the clutch which is connected to the power output side of the engine is provided with an axially extending bell-shaped flange which surrounds the friction and outer discs, the pressure plate with its flange, and the counter disc which rests on said flange. The said bell-shaped flange also surrounds the cone-shaped spring and adjacent spring ring as well as the discs engaging said spring ring and the spring rings for said last mentioned springs.

According to this arrangement, not only are all parts of the clutch mounted in a bell-shaped member common thereto but it is also possible to reduce the dimensions of the clutch to a minimum.

Furthermore, in accordance with the present invention, two driven plates with friction facings are respectively connected to opposite sides of the hub flange, while the thickness of the outer disc located between said driven plates is less than the distance between said two driven plates so that, when disengaging the clutch, automatically a predetermined disengaging distance will be obtained.

Thus, in contrast to the heretofore known multi-disc friction clutches, with the clutch according to the present invention said clutch discs are not displaceable individually in axial direction but remain connected to the hub.

The axial play between the friction discs and the outer disc necessary for a disengagement of the clutch is assured by the structurally determined lateral distance between the facings on the driven plates and the intermediate disc which latter has a thickness less than the hub flange to which the driven plates are connected.

A further advantage of the clutch construction according to the present invention consists in the simple way in which the lid for the support of the cone-shaped spring can be connected. Whereas with heretofore known clutches with cone-shaped springs, the lid has to be screwed against a flange, with the arrangement according to the present invention, the lid can be rested against a spring ring in the bell-shaped flange of the outer body. The lid is from the start pressed in by the spring ring in order to impart upon the cone-shaped spring the pre-tension corresponding to the torque to be conveyed.

Structural arrangement

Referring now to the drawing in detail, the clutch shown therein comprises an outer body 12 for connection with the output side of the driving engine. The outer body 12 is journalled on the power output shaft 13 in any convenient manner for instance by means of ball bearings or needle bearings. Also mounted on shaft 13 is the hub body 11' provided with a radially extending flange 11. Driven plates 2, 2' are firmly secured to both sides of flange 11, for instance by means of rivets 14. The plates 2, 2' are in conventional manner provided on both sides thereof with friction linings or facings 19. Arranged between the inner frictional facings of plates 2 and 2' is an outer or intermediate disc 3. The arrangement is such that the distance between those surfaces of the frictional facings which are adjacent to the intermediate disc 3 is greater than the thickness of disc 3 to such an extent that when the inner facing of plate 2' is pressed against disc 3 while the latter engages the adjacent facing of plate 2, the facing lined portion of plate 2' will be slightly arched or bent toward the facings of plate 2. Disc 3 is connected to a flanged skirt portion 1 of the outer body 12 by means of extensions 15 which engage corresponding recesses 16 in said flanged portion 1, so that disc 3 cannot rotate relative to the outer body 12. The flanged portion 1 extends in a bell-shaped manner in axial direction over the plates 2, 2' and disc 3 and also over the customary pressure plate 4. Disc 3 is movable in axial direction as is clearly evident from FIG. 1.

The pressure plate 4 is in customary manner provided with a flanged portion 5 by means of which it is mounted on a coaxially arranged counter plate 6. Counter plate 6 is by means of cutouts 6a (FIG. 6) substantially centered in said flanged portion 5 of pressure plate 4. As will be seen from FIGS. 3 and 6, pressure plate 4 has as many flanged portions 5 as there are cutouts 6a in counter plate 6. The cutouts 6a are formed by radial tongues 6b which engage the recesses between each two flanged portions 5, whereas extensions 6c of said tongues 6b engage the cutouts 17 (FIG. 2) in the flanged portion or skirt 1 and are displaceable therein in axial direction of said skirt. The flanged portion 5 is provided with an annular recess 20 in which is located a cone spring 7 such as a Belleville spring which rests against a spring ring 8 mounted in an annular groove 21 of the flanged portion 5. The spring 7 is pre-tensioned by the supporting margin below the lid 10 which in its turn rests against a tension spring 9 mounted in an annular groove 22 in the flanged portion 1 of the outer body 12.

In conformity with the present invention, and as shown in FIG. 1, all elements are arranged within the flanged portion or bell-shaped skirt portion 1. The recesses 16, 17 (see FIG. 2) of portion 1 in addition to resting the intermediate disc 3, also receive the counter plate 6 in the said recesses 17. The counter plate 6 on one hand serves for centering and taking along the pressure plate 4 and on the other hand also serves as a support for the spring 7.

For purposes of disengaging the clutch, a throw-out collar 18 is in a manner known per se pressed inwardly toward shaft 13 so that through the intervention of spring 7 the pressure plate 4 is moved axially outwardly. During this operation, the spring 7 resting between the two supporting surfaces of the elements 6 and 10 rests against the spring ring 8 and thus moves the pressure plate 4 in axial direction away from the plates 2, 2'.

As a result thereof, the plates 2, 2' and disc 3 which in the engaged condition of the clutch are pressed against each other become free of each other. As stated above, according to the present invention, the distance between those frictional surfaces of the plates 2, 2' which face each other is greater than the thickness of the intermediate disc 3. It will therefore be evident that as soon as the pressure exerted upon plate 2' by spring 7 and pressure plate 4 is relieved, plate 2' will return to its original plate plane. In other words, that area of plate 2' which is provided with a frictional facing and which is slightly arched or elastically bent by the pressure acting thereupon during the engagement of the clutch will straighten out completely so as to be located in a single plane. Thus, when the pressure of spring 7 causing the pressure plate 4 to press the facing of plate 2' against the intermediate disc 3 is relieved, plate 2' will detach itself from the intermediate disc 3 and aided by plate 2 likewise tending to return to its plane starting position will be axially displaced by a certain disengagement stroke. In this disengaged position, the plates 2, 2' are substantially completely plane. In this way a proper disengagement of the plates 2, 2' from intermediate disc 3 will always be assured.

The arrangement according to the invention may be employed for wet as well as for dry clutches. In this connection, it is immaterial by which structural means, in conformity with the present invention, the distance between hte frictional facings facing each other is made greater than the thickness of the intermediate disc therebetween.

It is, of course, to be understood that the present invention is, by no means, limited to the particular construction shown in the drawing but also comprises any modifications within the scope of the appended claims.

What we claim is:

1. In a clutch, especially for motor vehicles: a bell-shaped body adapted to be drivingly connected to a drive shaft and comprising a hub portion and a substantially cylindrical skirt extending in axial direction of said hub portion, said skirt having first cutouts and second cutouts, a hub member having a radially extending flange and being located within said skirt in radially spaced relationship thereto, said hub member being substantially coaxial with said skirt and being adapted drivingly to be connected to an output shaft, a plurality of friction plates respectively connected to opposite sides of said flange, intermediate disc means extending between said friction plates and engaging said first cutouts for rotation with said bell-shaped body and for selective frictional driving engagement with said friction plates, an axially displaceable pressure plate having a flanged portion and being mounted within said skirt for selectively exerting pressure on said friction plates and said intermediate disc means, an annular supporting disc member having its major portion located within said skirt and being provided with radial extensions extending into said second cutouts for establishing rotatable connection between said supporting disc member and said bell-shaped body, said supporting disc member also being provided with peripheral cutouts slidably engaging said flanged portion, a cone-shaped spring having its marginal portion in engagement with said pressure plate and being operable selectively to move said pressure plate axially in either direction for respectively establishing and interrupting frictional engagement between said friction plates and said intermediate disc means, said supporting disc member having its inner marginal portion curved toward and in engagement with the inner side of the outer marginal portion of said spring at points spaced from the points of contact of said spring with said pressure plate, an annular lid member having its inner marginal portion curved toward and engaging the outer side of said spring substantially opposite to the lid member engaging portion of said supporting disc member, and a spring ring supported by and in engagement with the inner surface of said skirt and engaging the outer marginal portion of said lid member to thereby secure the latter and said friction plates and said pressure plate as well as said intermediate disc means within said skirt.

2. An arrangement according to claim 1, in which the outer marginal portion of said skirt is provided with an annular recess having said spring ring arranged therein.

References Cited in the file of this patent

UNITED STATES PATENTS

| | | |
|---|---|---|
| 891,475 | Heaslet | June 23, 1908 |
| 2,738,864 | Becker | Mar. 20, 1956 |
| 2,835,366 | Haussermann | May 20, 1958 |

FOREIGN PATENTS

| | | |
|---|---|---|
| 392,583 | Germany | Mar. 29, 1924 |